United States Patent [19]

Nagai

[11] Patent Number: 4,736,723
[45] Date of Patent: Apr. 12, 1988

[54] SYSTEM AND METHOD FOR CONTROLLING THE IGNITION TIMING OF AN INTERNAL COMBUSTION ENGINE

[75] Inventor: Masaaki Nagai, Fuchu, Japan

[73] Assignee: Fuji Jukogyo Kabushiki Kaisha, Tokyo, Japan

[21] Appl. No.: 813,120

[22] Filed: Dec. 24, 1985

[30] Foreign Application Priority Data

Dec. 28, 1984 [JP] Japan .................. 59-280562

[51] Int. Cl.$^4$ .................. F02D 41/22; F02P 5/14
[52] U.S. Cl. .................. 123/425; 123/435
[58] Field of Search .................. 123/419, 425, 435, 436

[56] References Cited

U.S. PATENT DOCUMENTS

| | | | |
|---|---|---|---|
| 4,344,400 | 8/1982 | Asano | 123/425 |
| 4,448,163 | 5/1984 | Yoshida | 123/425 X |
| 4,513,716 | 4/1985 | Haraguchi et al. | 123/425 |
| 4,530,328 | 7/1985 | Komurasaki | 123/425 |
| 4,541,382 | 9/1985 | Hosoe et al. | 123/425 |

FOREIGN PATENT DOCUMENTS 0091765 7/1980 Japan .

Primary Examiner—Willis R. Wolfe, Jr.
Attorney, Agent, or Firm—Martin A. Farber

[57] ABSTRACT

A system and method for deciding the ignition timing at the acceleration of an engine and the steady state. The system has an acceleration ignition timing correction subroutine and a steady state ignition timing correction subroutine. In the acceleration ignition timing subroutine, a basic ignition timing obtained in the steady state ignition timing correction subroutine is corrected by a quantity read from a table so as to sufficiently advance the ignition timing for the acceleration and the steady state.

2 Claims, 10 Drawing Sheets

SYSTEM AND METHOD FOR CONTROLLING THE IGNITION TIMING OF AN INTERNAL COMBUSTION ENGINE

BACKGROUND OF THE INVENTION

The present invention relates to a system and method for controlling the ignition timing of an internal combustion engine such as an automotive engine.

A learning control system for correcting the ignition timing has been proposed. The control system is adapted to advance the ignition timing so as to produce a maximum torque as long as the level of engine knocking does not exceed a tolerable level. The ignition timing stored in a RAM is corrected by a small correcting quantity (quantity of correction) and converged to a desired value little by little. The correcting quantity for the ignition timing at every updating operation is gradually reduced as the number of the learning increases, that is as the ignition timing approaches the desired value.

On the other hand, when the engine is accelerated, the ignition timing is reduced in order to increase the power of the engine. In a conventional ignition timing learning control system, a single program is provided for correcting the ignition timing including the ignition timing for the acceleration. Since the program is provided for correcting the timing at steady state of engine operation, the program comprises a plurality of steps in order to finely correct the timing. Accordingly, it takes a long time to advance the timing at the acceleration. As a result, the ignition can not be sufficiently advanced to meet the requirement of the acceleration.

SUMMARY OF THE INVENTION

An object of the present invention is to provide a system and method which may quickly correct the ignition timing at acceleration of an engine.

Another object of the present invention is to provide a system and method which may correct the ignition timing to a maximum advance value within an allowable range so as to produce the largest torque.

To this end, in the system and method of the present invention, the corrections of the timing at the acceleration and at the steady state are independently performed, respectively.

According to the present invention, there is provided a system and method for controlling the ignition timing of an internal combustion engine having a microprocessor and an ignition timing control device comprising, first sensing means for sensing operating conditions of the engine at steady state and for producing an engine operating condition signal, second sensing means for sensing the acceleration of the engine and for producing an acceleration signal, and a knock sensor for sensing engine knock and for producing a knock signal.

The system further comprises first means responsive to the engine operating condition signal and knock signal for producing a first ignition timing correcting signal representing an ignition timing correcting quantity at a time for deciding the ignition timing and for producing a basic ignition timing based on the first ignition timing correcting signal, second means responsive to the acceleration signal and the knock signal for obtaining from a table a second ignition timing correcting signal representing an ignition timing correcting quantity for correcting the basic ignition timing decided by the first ignition timing correcting signal.

The other objects and features of this invention will become apparently understood from the following description with reference to the accompanying drawings.

DETAILED DESCRIPTION OF THE PREFERRED EMBODIMENT

Figure 1:
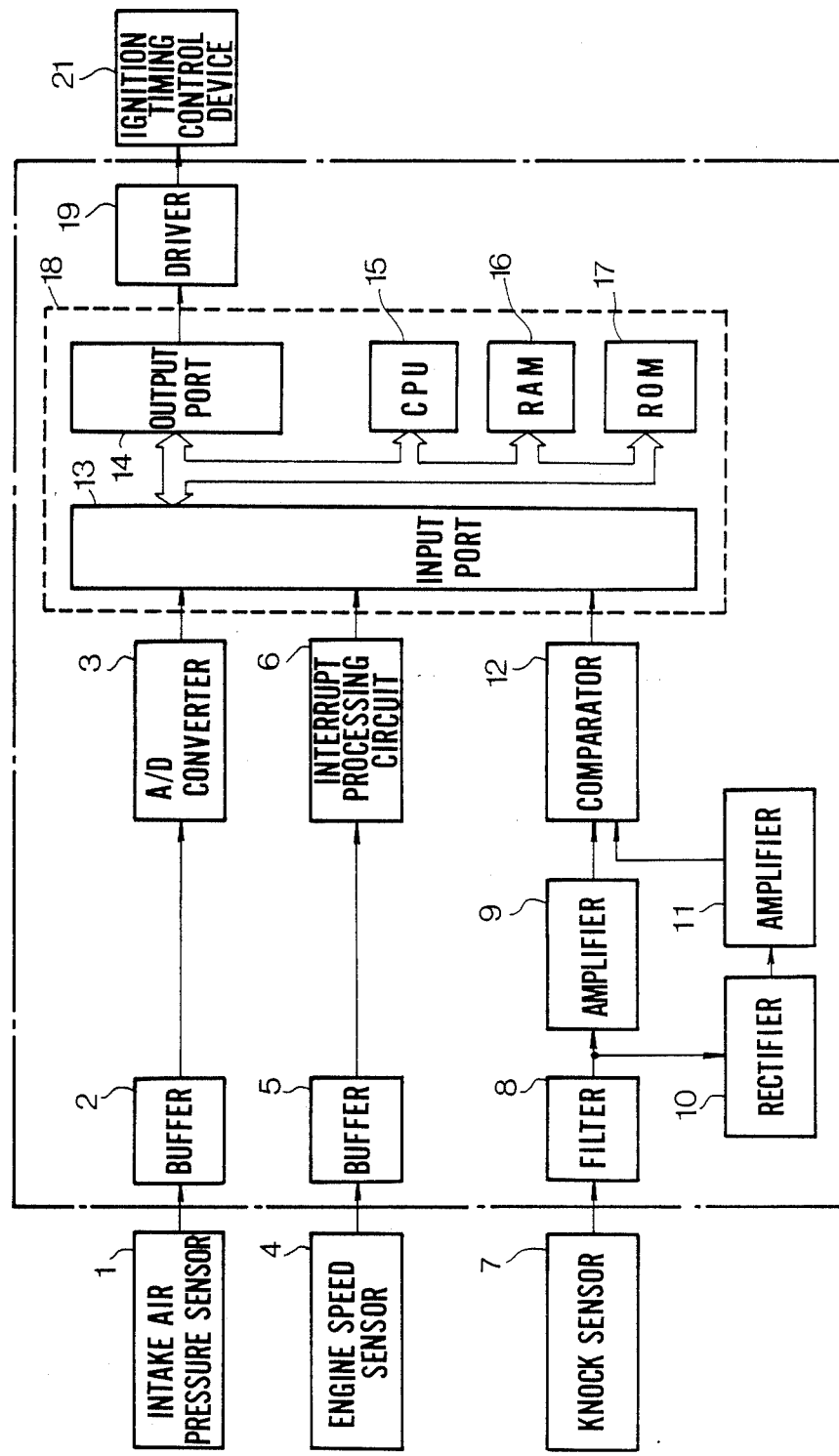
FIG. 1 is a block diagram showing a control system according to the present invention.

Referring to FIG. 1, an intake air pressure (or quantity) sensor 1, engine speed sensor 4 such as a crankangle sensor, and knock sensor 7 are provided to detect engine operating conditions. The output of the sensor 1 is applied to an A/D converter 3 through a buffer 2, and the output of the sensor 4 is applied to an interrupt processing circuit 6 through a buffer 5. The output of the knock sensor 7 is applied to a comparator 12 through a filter 8 and an amplifier 9, and, on the other hand, to the comparator 12 through a rectifier 10 and amplifier 11. The comparator 12 compares both inputs and produces an output signal when an engine knock having a higher level than a predetermined value is generated. The outputs of the A/D converter 3, circuit 6 and comparator 12 are applied to a microprocessor 18 through an input port 13.

The microprocessor 18 comprises a CPU 15, RAM 16, ROM 17 and output port 14. The output of the microprocessor 18 is applied to an ignition timing control device 21 through a driver 19 so as to control the ignition timing in accordance with the engine operating conditions sensed by the sensors 1, 4 and 7.

Figure 5A:
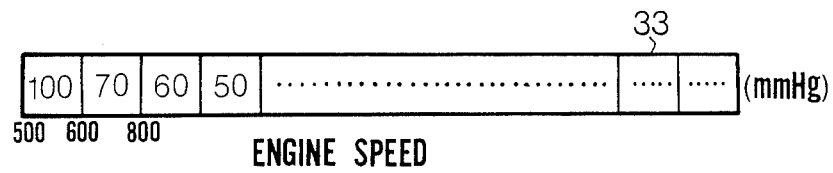
FIGS. 5a to 5c are tables for an acceleration subroutine.
Figure 6:
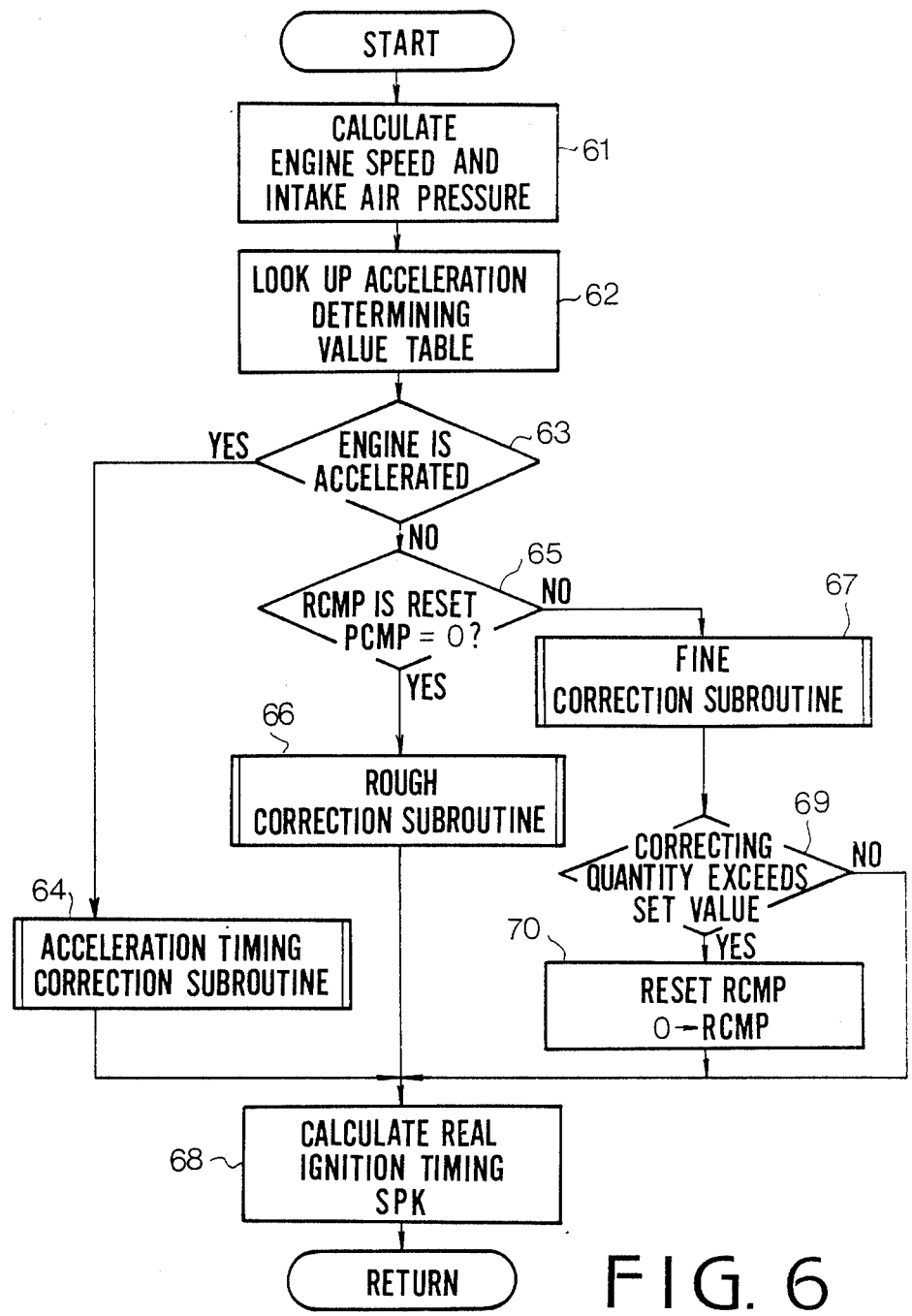
FIGS. 6, 7, 8, 9a and 9b are flow charts showing the operation of the system.

FIG. 6 shows summarizes the operation of the control system. When the program starts, engine speed and intake air pressure are calculated at a step 61, and the difference between the pressures at the program and at the last program is calculated. Further, an acceleration determining value at the engine speed is read from an acceleration determining value table 33 of FIG. 5a at a step 62. Thereafter, it is determined, at a step 63, whether the engine is accelerated by comparing the pressure difference with an acceleration determining value read out at the step 62. If the difference is larger than the value, it is determined that the engine is accelerated. When the engine is accelerated, the program proceeds to a correction subroutine 64 for acceleration ignition timing. In the subroutine, a correcting quantity (quantity of correction) for the acceleration is obtained and stored in the RAM 16.

If the engine is not accelerated, the program proceeds to a step 65, where it is decided whether a rough correction has been executed (if a rough correction completion flag RCMP is set). In accordance with the decision, a rough correction or a fine correction is executed in a rough correction subroutine 66 or a fine correction subroutine 67. In the subroutine 66, a basic ignition timing is obtained and the timing is corrected at a step 68 by a correcting quantity obtained in the subroutine 64 or 67, as described hereinafter. If the basic ignition timing obtained in the rough correction subroutine largely deviates from a new desired value by a large disturbance during the fine correcting operation in the subroutine 67, the correcting quantity in the subroutine 67 becomes very large. In such a case, it takes a long time to correct the deviation. Accordingly, if the correcting quantity exceeds a predetermined value at at step 69, the rough correction completion flag RCMP is reset at a step 70, whereby the deviation is quickly corrected in the rough correction subroutine 66.

Figure 2:
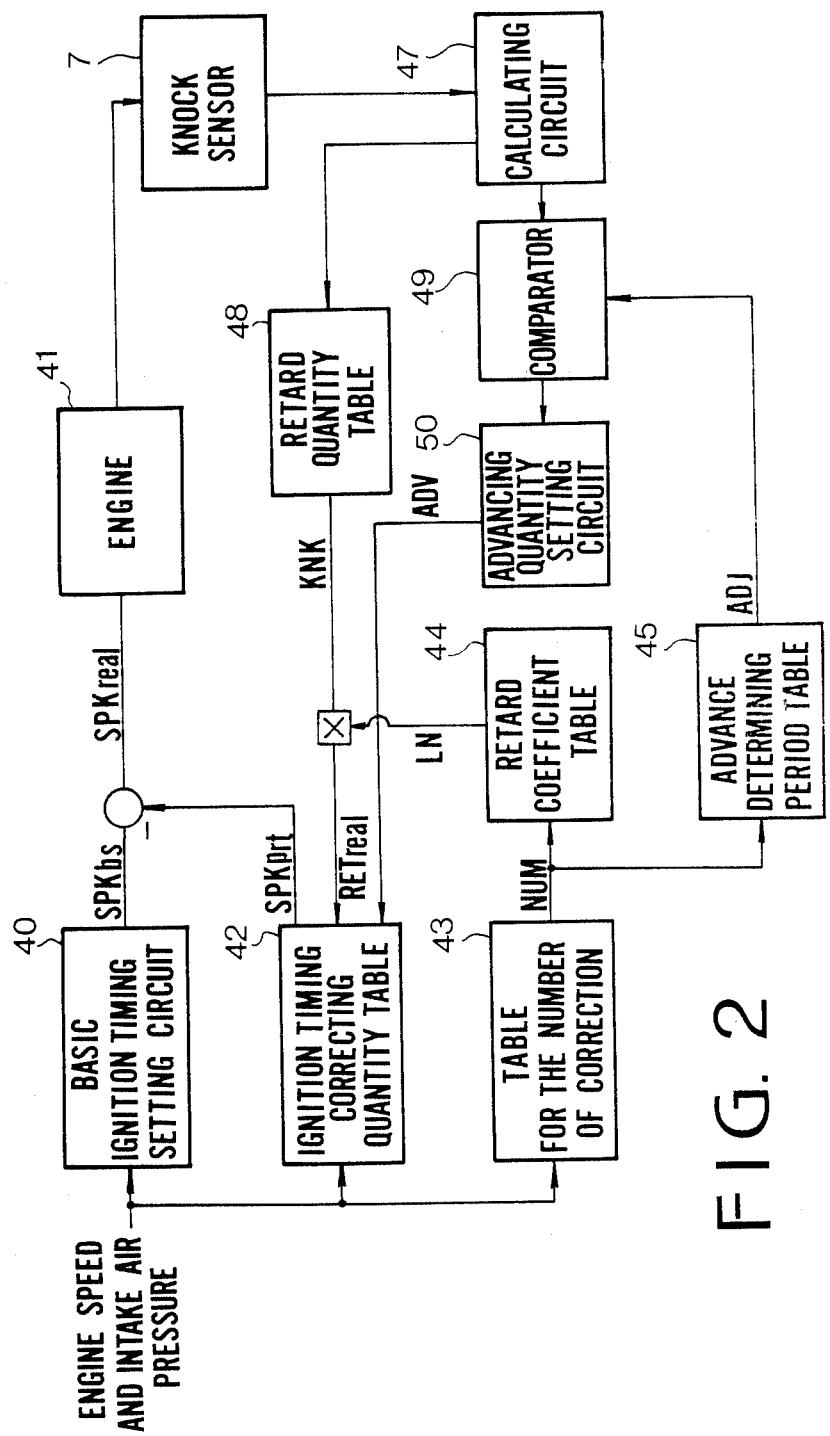
FIG. 2 is a block diagram showing a main part of the control system.
Figure 3A:
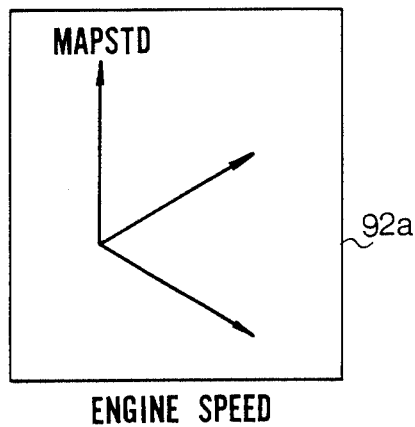
FIGS. 3a and 3b show tables storing a plurality of ignition timings.
Figure 3B:
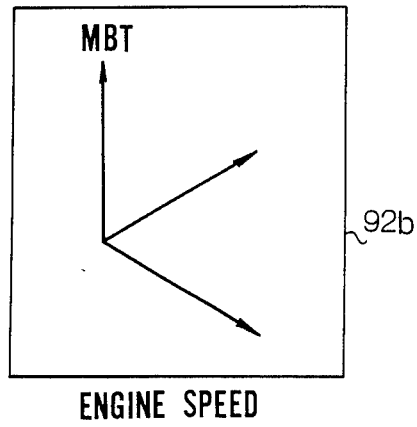
Figure 8:
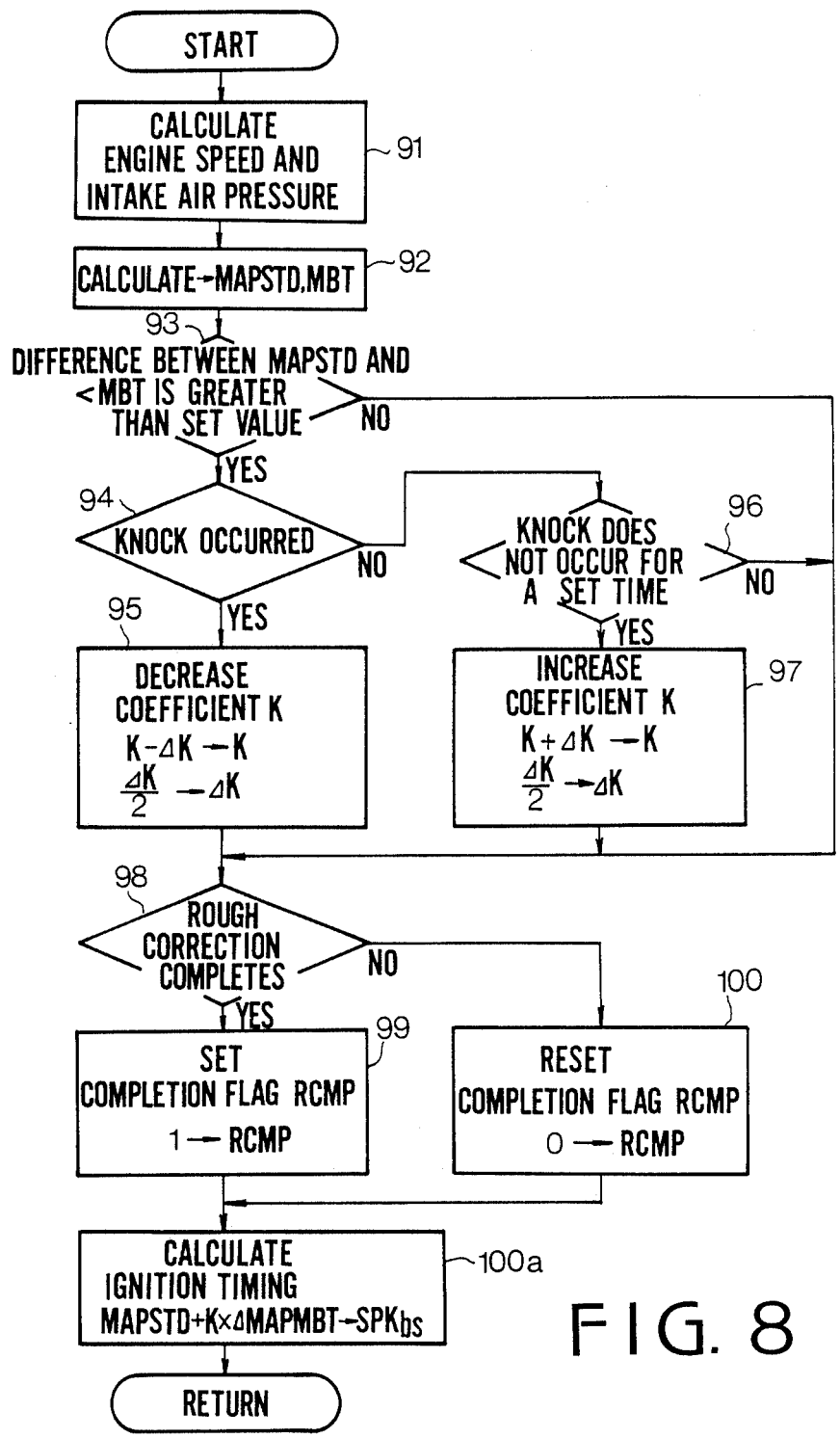

The rough correction is an operation for obtaining a basic ignition timing $SPK_{bs}$ which is calculated in a basic ignition timing setting circuit 40 shown in FIG. 2. FIG. 8 shows the operation of the rough correction. At a step 91, the engine speed and intake air pressure are calculated based on the outputs signals of the sensors 1 and 4. Thereafter, at a step 92, a first maximum ignition timing MAPSTD and a second maximum ignition timing MBT are read from tables 92a and 92b (FIGS. 3a, 3b) in the ROM 17, in accordance with the engine speed and intake air pressure. The first maximum ignition timing is maximum timing for producing maximum torque with low-octane gasoline without occurrence the knocking and the second maximum ignition timing is maximum timing for producing maximum torque with high-octane gasoline without knock occurring.

Figure 4:
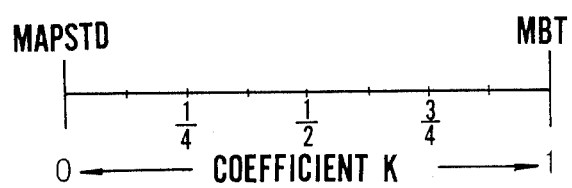
FIG. 4 shows a range of a coefficient K.

In the system, a coefficient K for correcting the ignition timing is provided. The value of the coefficient K is preliminarily set to a value between zero and 1 as shown in FIG. 4.

The coefficient K is stored in the RAM 16 and updated in accordance with engine operating conditions so as to roughly converge the ignition timing to a desired ignition timing. The updating is performed under a predetermined condition and the condition is determined at a step 93. When the difference between the first and second maximum ignition timings read from the tables 92a and 92b (FIG. 3a and 3b) is larger than a predetermined degree, for example 5°, the updating is performed. Namely, the program proceeds to a step 94, where it is determined whether a knock has occurred during the program. When the occurrence of knock is determined, the program proceeds to a step 95, and if not, proceeds to a step 96. At step 95, the coefficient K is decremented by a correcting quantity $\Delta K (\Delta K = K/2)$, and the remainder $K - \Delta K$ is stored in the RAM 16 as a new coefficient for the next updating. Accordingly, the correcting quantity $\Delta K$ at the next updating is $(K - \Delta K)/2$. Namely, the correcting quantity is one-half of the coefficient K at updating. More particularly, if the initial coefficient is ½, the correcting quantity is ¼, and if it is 0 or 1, the correcting quantity is ½ as seen from FIG. 4.

At the step 96, it is determined whether the engine has operated without knock occurring for a predetermined period. When knocking does not occur for the period, the coefficient K is incremented by the correcting quantity $\Delta K$ at a step 97.

After the updating of the coefficient K at step 95 or 97, it is determined whether the rough correction is completed at a step 98. As will be understood from the above description, the correcting quantity $\Delta K$ decreases as the number of the correction increases. In the system, when the correcting quantity reaches a predetermined small value, the rough correction is completed. Accordingly, if the quantity $\Delta K$ reaches the predetermined value, a rough correction completion flag RCMP is set at a step 99, or if not, the flag is reset at a step 100. On the other hand, the total correcting quantity $SPK_{prt}$ and the number of correction NUM of the ignition timing is stored in an ignition timing correcting quantity table 42 and a table 43 (FIG. 2) for the number of the correction. At a step 100a, a basic ignition timing $SPK_{bs}$ is calculated by the following formula $$SPK_{bs} = MAPSTD + K \times \Delta MAPMBT \qquad (1)$$

where $\Delta MAPMBT = MBT - MAPSTD$

The basic ignition timing is applied to an engine 41 (FIG. 2) to operate the engine at the ignition timing. The coefficient K is stored in the RAM 16. If the rough correction is not completed, the coefficient K is updated at the next program so as to roughly converge the ignition timing to a desired ignition timing as described above. It will be understood that if the initial coefficient K is 0, the basic ignition timing $SPK_{bs}$ calculated by the formula (1) is the maximum ignition timing MAPSTD at the first program. The basic ignition timing $SPK_{bs}$ obtained by the rough correction is further corrected by the fine correcting operation as described hereinafter.

Figure 9A:
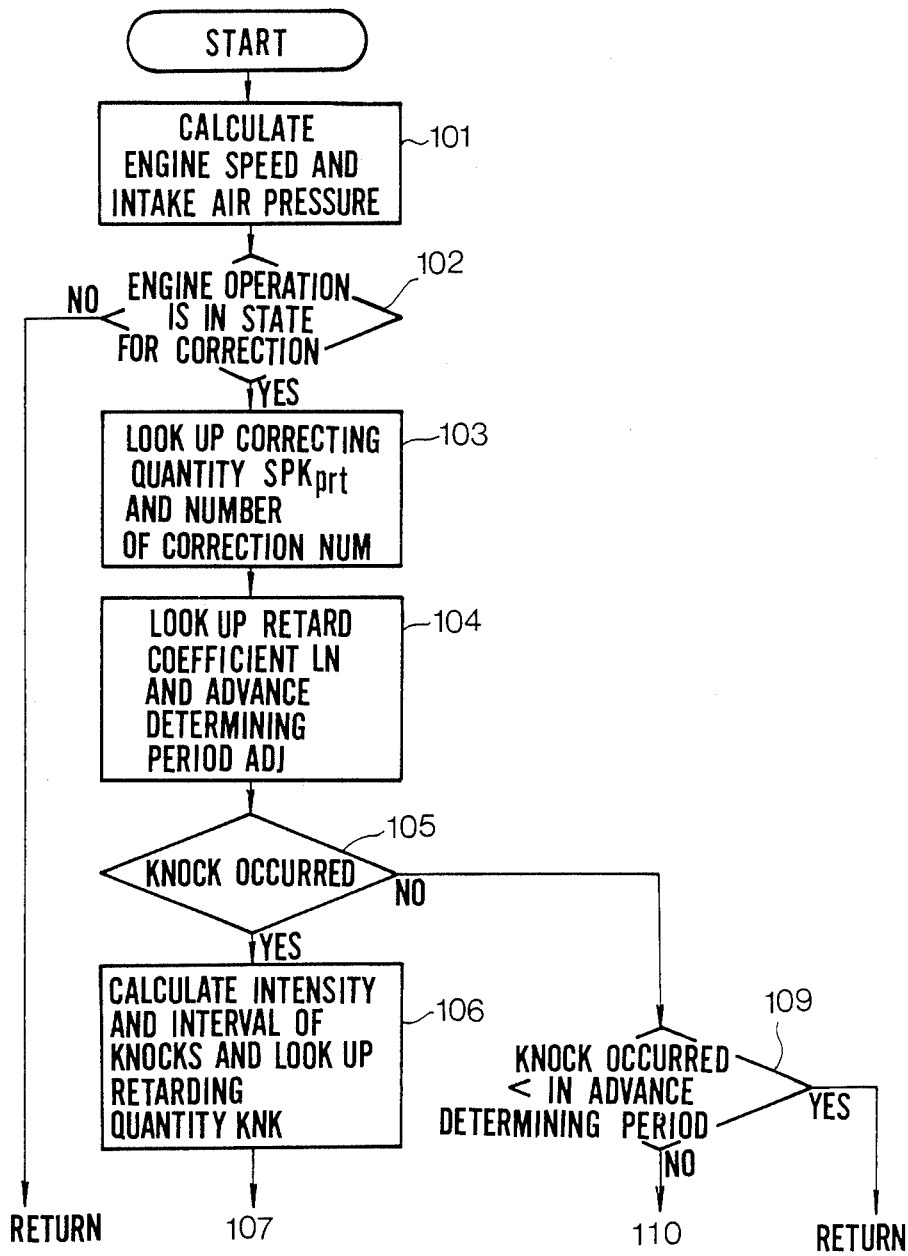
Figure 9B:
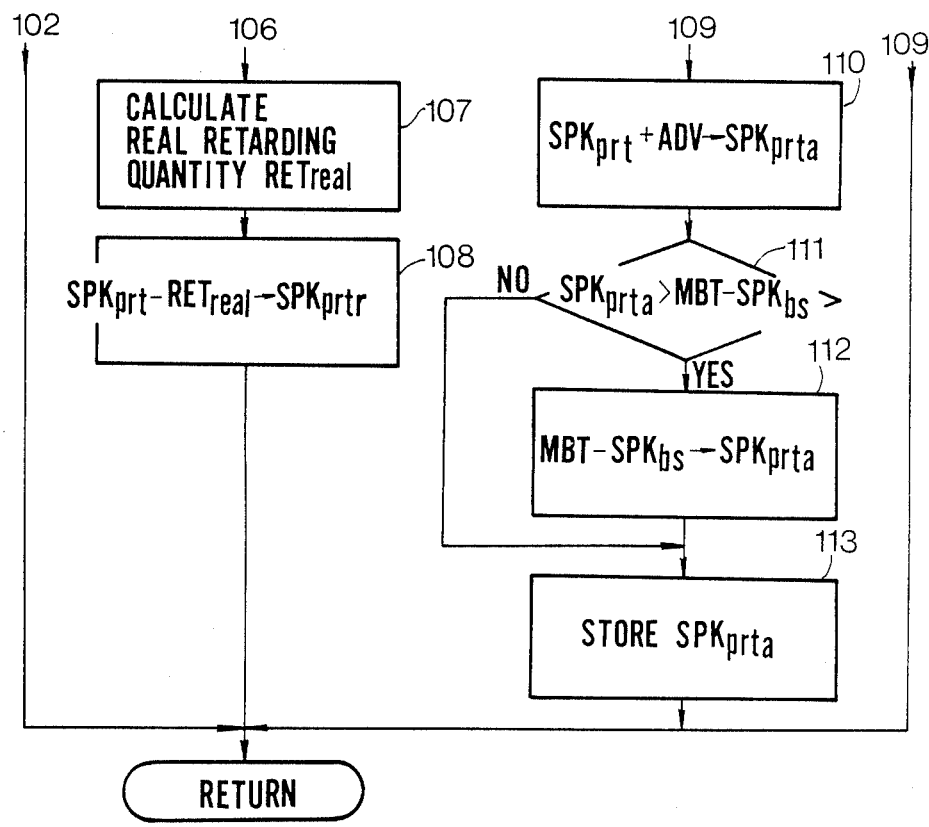
Figure 10A:
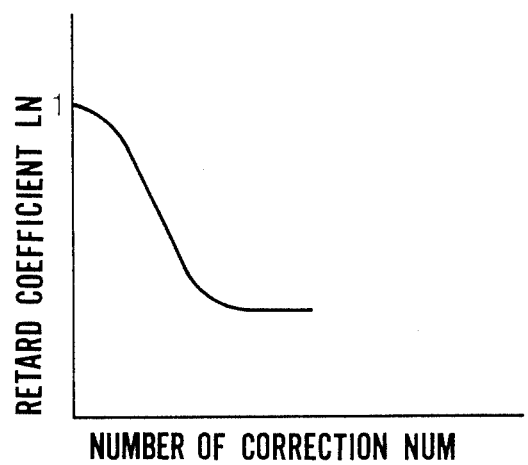
FIGS. 10a and 10b show a retard coefficient table and an advance determining period table, respectively.
Figure 10B:
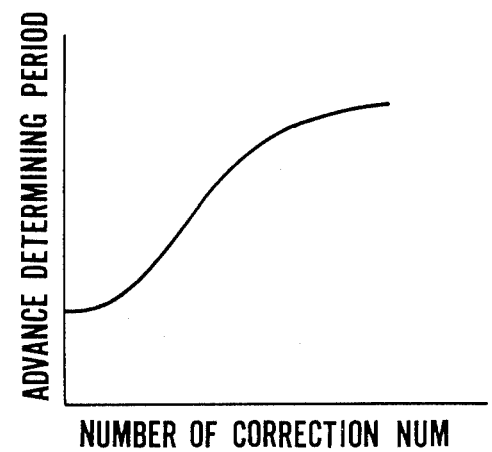

Referring to FIGS. 9a and 9b, at a step 102, it is decided whether the engine operation is in a range which is proper to correct the basic ignition timing $SPK_{bs}$. If it is in the range, the correcting quantity $SPK_{prt}$ and the number of correction NUM are read from tables 42 and 43 at a step 103. Then, at a step 104, a retard coefficient LN for retarding quantity RET is looked up from a retard coefficient table 44 (FIG. 2) of FIG. 10a in accordance with the number of correction NUM, and an advance determining period ADJ is looked up from an advance determining period table 45 (FIG. 2) of FIG. 10b in accordance with the number of correction NUM. Thereafter, the program proceeds to a step 105, where it is decided whether a knock has occurred during the program. When the occurrence of knocking is determined, the program proceeds to a step 106, and if not, it proceeds to a step 109. At step 106, the intensity of the knocking and the interval of the knocks are calculated at a calculating circuit 47 (FIG. 2), and then, the retarding quantity KNK is looked up from a retarding quantity table 48 in accordance with the intensity and the interval of the knocking. At a step 107, a real retarding quantity $RET_{real}$ is calculated by multiplying the retarding quantity KNK and retard coefficient LN together ($RET_{real} = KNK \times LN$). Thereafter, the program proceeds to a step 108, where the correcting quantity $SPK_{prt}$ stored in the table 42 is subtracted with the real retarding quantity $RET_{real}$ to obtain a new correcting quantity $SPK_{prta}$ which is stored in the table 42.

On the other hand, at the step 109, it is decided whether a knock occurred in the advance determining period ADJ, which is performed at a comparator 49 in FIG. 2. When knocking does not occur in the period, the program proceeds to a step 110, where an advancing quantity ADV of a constant small value is added to the correcting quantity $SPK_{prt}$ to obtain a new correcting quantity $SPK_{prta}$ which is performed in an advancing quantity setting circuit 50 in FIG. 2 and stored in the table 42. Thereafter, at a step 111, it is determined whether the new correcting quantity $SPK_{prta}$ is larger than a limit value which is obtained by subtracting the basic ignition timing $SPK_{bs}$ from the maximum ignition timing MBT (MBT−SPK$_{bs}$). When the new correcting quantity SPK$_{prta}$ is smaller than the limit value, the new correcting quantity is stored in the table 42 at a step 113. If it is larger than the limit value, the value of MBT−SPK$_{bs}$ is used as a new correcting quantity (at step 113) and stored in the table 42. The stored value SPK$_{prta}$ is added to the basic ignition timing SPK$_{bs}$ at step 68 (FIG. 6).

Figure 5B:
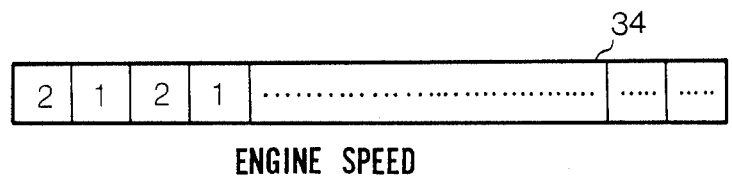
Figure 5C:
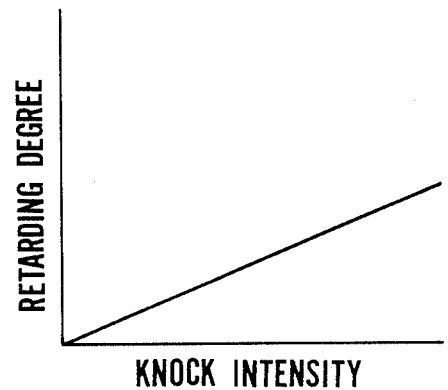
Figure 7:
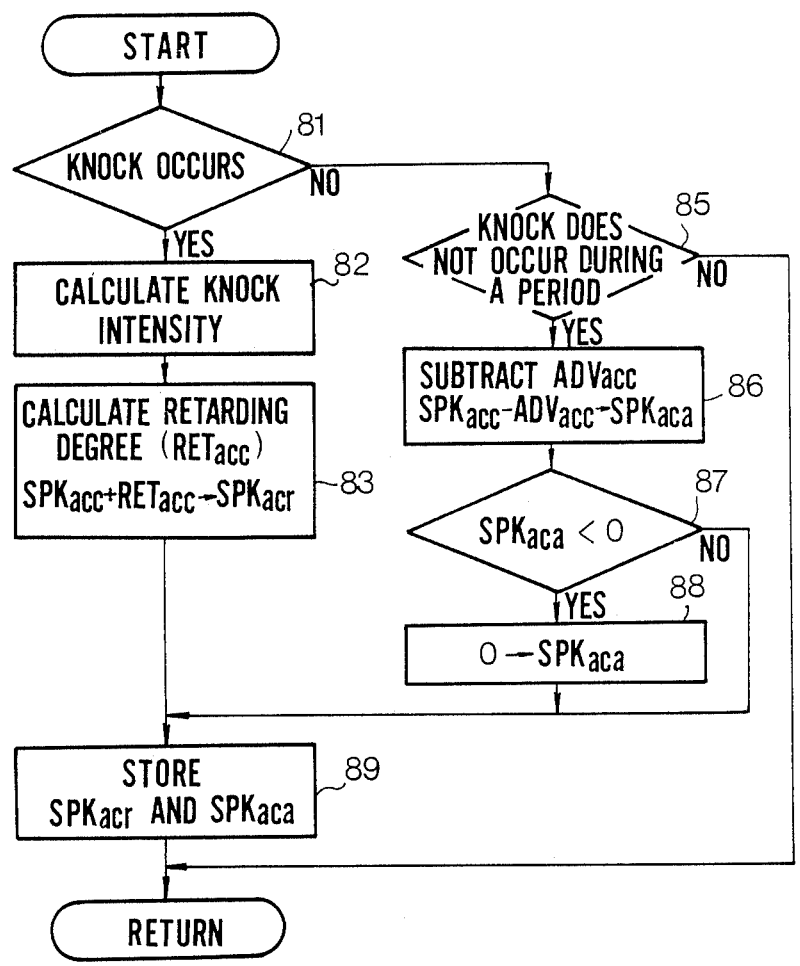

Explaining the operation in the subroutine 64 for acceleration with reference to FIG. 7, the occurrence of engine a knock is decided at a step 81. When knock occurs, the intensity of the knock is calculated at a step 82. In accordance with the intensity, retarding degree RET$_{acc}$ of ignition timing is looked up from a table of FIG. 5c at a step 83. On the other hand, correcting degree SPK$_{acc}$ is looked up from a table 34 of FIG. 5b in accordance with the engine speed, and the retarding degree RET$_{acc}$ and the correcting degree SPK$_{acc}$ are added to produce a correcting quantity SPK$_{acr}$. The correcting quantity SPK$_{acc}$ is stored in the RAM 16 at a step 89 for correcting the basic ignition timing obtained in the subroutine 66.

If knock does not occur, it is determined whether knock does not occur during a predetermined period at a step 85. It is does not occur, the program proceeds to a step 86 where a predetermined advancing degree ADV$_{acc}$ is subtracted from the correcting degree SPK$_{acc}$ (SRK$_{acc}$−ADV$_{acc}$) to obtain a correcting quantity SPK$_{aca}$. Thereafter, the program proceeds to a step 87, where it is determined whether the correcting quantity SPK$_{acc}$ is negative. If the SPK$_{aca}$ is negative, the value of SPK$_{aca}$ is set to zero at a step 88. The value is stored in the RAM 16 at the step 89. The stored value SPK$_{acr}$ or SPK$_{aca}$ is added to the basic ignition timing SPK$_{bs}$ at step 68 (FIG. 6) to obtain a real ignition timing SPK. The data stored in the table 34 (FIG. 5b) is rewritten with the value SPK$_{aca}$ or SPK$_{acr}$ for the next correction.

In accordance with the invention, since the correction of the ignition timing at acceleration is independent from the correction at steady state, it is possible to quickly correct the timing by adding a large correcting quantity.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A system for controlling the ignition timing of an internal combustion engine having a microprocessor and an ignition timing control device comprising:
   first sensing means for sensing operating conditions of the engine at steady state and for producing an engine operating condition signal;
   second sensing means for sensing the acceleration of the engine and for producing an acceleration signal;
   a knock sensor for sensing engine knock and for producing a knock signal;
   first means responsive to the engine operating condition signal and knock signal for producing a first ignition timing correcting signal representing an ignition timing correcting quantity at a time for deciding the ignition timing and for producing a basic ignition timing based on the first ignition timing correcting signal;
   second means responsive to the acceleration signal and the knock signal for obtaining from a table a second ignition timing correcting signal representing an ignition timing correcting quantity for correcting the basic ignition timing decided by the first ignition timing correcting signal.

2. A method for controlling the ignition timing of an internal combustion engine having a microprocessor and an ignition timing control device comprising the steps of:
   sensing operating condition of the engine at steady state and producing an engine operating condition signal;
   sensing the acceleration of the engine and producing an acceleration signal;
   sensing engine knock and producing a knock signal;
   producing a first ignition timing correcting signal representing an ignition timing correcting quantity at a time for deciding the ignition timing in response to the engine operating condition signal and knock signal and producing a basic ignition timing based on the first ignition timing correcting signal; and
   obtaining from a table a second ignition timing correcting signal representing an ignition timing correcting quantity in response to the acceleration signal and the knock signal and correcting the basic ignition timing decided by the first ignition timing correcting.

* * * * *